United States Patent
Liao et al.

(10) Patent No.: US 11,638,316 B2
(45) Date of Patent: Apr. 25, 2023

(54) MULTICONNECTIVITY FUNCTION IN APPLICATION CLOUD FOR 5G SYSTEMS

(71) Applicant: Intel Corporation, Santa Clara, CA (US)

(72) Inventors: Ching-Yu Liao, Hillsboro, OR (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 16/935,520

(22) Filed: Jul. 22, 2020

(65) Prior Publication Data

US 2021/0007166 A1   Jan. 7, 2021

Related U.S. Application Data

(60) Provisional application No. 62/881,879, filed on Aug. 1, 2019.

(51) Int. Cl.
*H04W 76/15* (2018.01)
*H04W 8/08* (2009.01)
(Continued)

(52) U.S. Cl.
CPC ............ *H04W 76/15* (2018.02); *H04W 8/08* (2013.01); *H04W 28/0846* (2020.05); *H04W 48/16* (2013.01); *H04W 60/00* (2013.01)

(58) Field of Classification Search
CPC ..... H04W 84/12; H04W 48/18; H04W 88/06; H04W 76/15; H04W 76/16; H04W 76/10; H04W 88/18; H04W 24/02; H04W 88/00; H04W 28/0819; H04W 8/00; H04W 8/18; H04W 8/186; H04W 8/20; H04W 80/04; H04W 24/04; H04W 36/0066; H04W 4/38; H04W 40/248; H04W 8/04; H04W 8/22;
(Continued)

(56) References Cited

U.S. PATENT DOCUMENTS

| | | | | |
|---|---|---|---|---|
| 2018/0183855 | A1* | 6/2018 | Sabella | H04W 52/0264 |
| 2021/0345067 | A1* | 11/2021 | Zhang | H04W 4/20 |
| 2022/0159446 | A1* | 5/2022 | Zhou | H04W 28/0268 |

OTHER PUBLICATIONS

3GPP TS 23.502 V16.1.0, 3rd Generation Partnership Project; Technical Specification Group Services and System Aspects; Procedures for the 5G System; Stage 2 (Release 16), dated Jun. 2019 (Year: 2019).*

(Continued)

*Primary Examiner* — Christopher M Brandt
(74) *Attorney, Agent, or Firm* — Schwegman Lundberg & Woessner, P.A.

(57) ABSTRACT

Systems and methods to support coexistence of multi-connectivity functions in 3GPP network and non-3GPP networks for UEs and to provide traffic routing policies and coordinate with ATSSS operation in 5GS are described. The AF subscribes to a registration-state notification event. A report is sent to the AF from the PCF or NEF. The report indicates a current registration state of a UE and is triggered when the registration state of the UE changes. The report may be sent with or without PDU session information, the former of which may be based on a determination by the AMF or the SMF. Traffic steering is enforced by the MAMS among multiple IP sessions coordinated via a single or a multiple PDU sessions in the 3GPP network.

17 Claims, 14 Drawing Sheets

(51) Int. Cl.
*H04W 28/08* (2023.01)
*H04W 60/00* (2009.01)
*H04W 48/16* (2009.01)

(58) Field of Classification Search
CPC ......... H04W 8/24; H04W 8/205; H04W 8/08;
H04W 28/0846; H04W 48/16; H04W
60/00; H04W 76/22; H04L 65/1066
See application file for complete search history.

(56) References Cited

OTHER PUBLICATIONS

"Unlicensed Integration with 5G Networks" by WBA 5G Workgroup, dated Oct. 2018 (Year: 2018).*

* cited by examiner

US 11,638,316 B2

MULTICONNECTIVITY FUNCTION IN APPLICATION CLOUD FOR 5G SYSTEMS

PRIORITY CLAIM

This application claims the benefit of priority to U.S. Provisional Patent Application Ser. No. 62/881,879, filed Aug. 1, 2019, which is incorporated herein by reference in its entirety.

TECHNICAL FIELD

Embodiments pertain to a multi-access network system. Some embodiments relate to simultaneous access to Third Generation Partnership Project (3GPP) $5^{th}$ generation (5G) networks and non-3GPP networks.

BACKGROUND

In a number of environments, such as industrial factories, a non-3GPP networks such as Wi-Fi® networks have been deployed. Although it may be desirable to deploy a 5G network in such an environment, support of mechanisms to simultaneously access both 3GPP and non-3GPP networks to enable features such as load balancing, coverage extension, and support of service continuity may be anything but straightforward.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
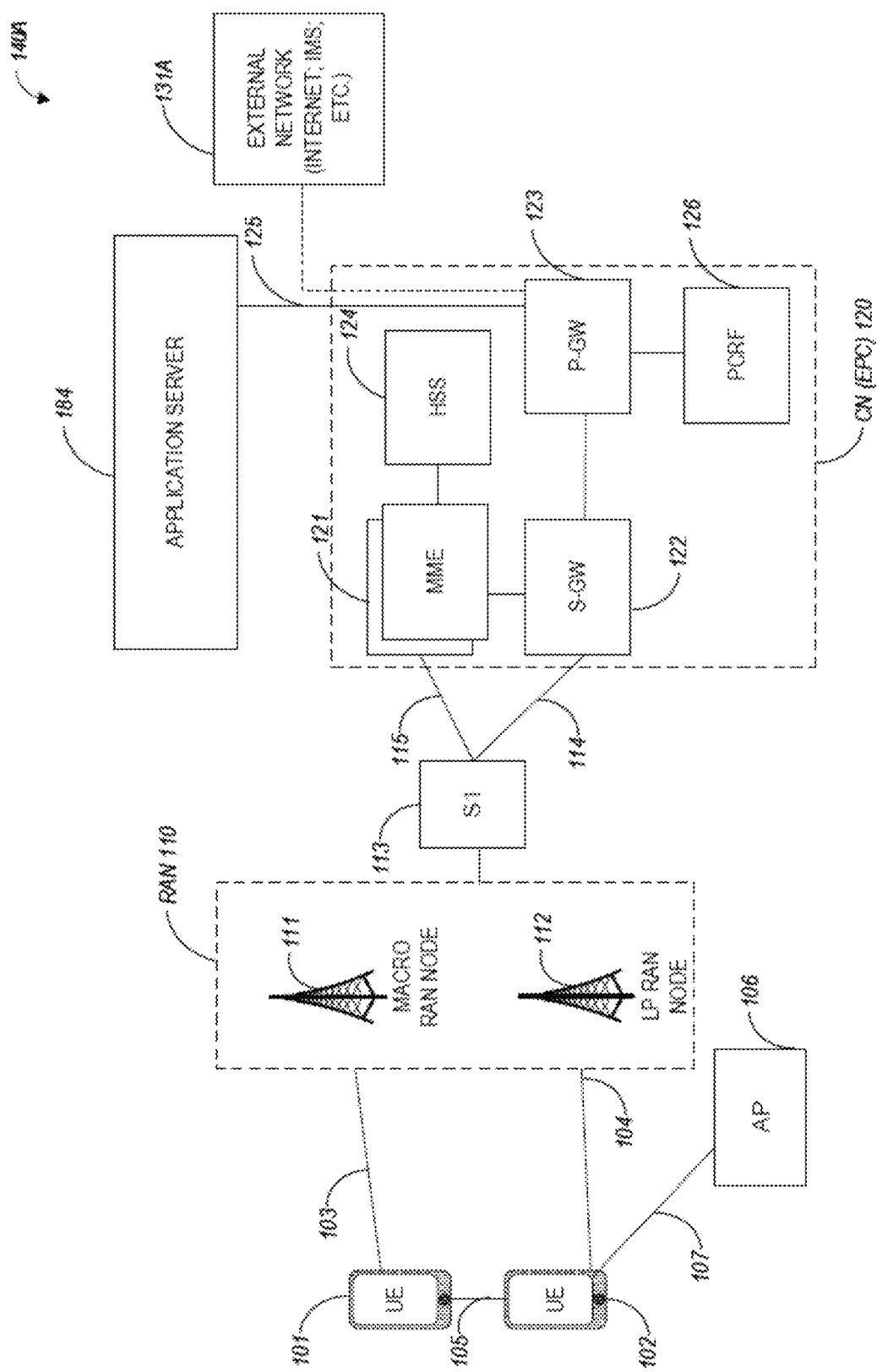
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an"anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
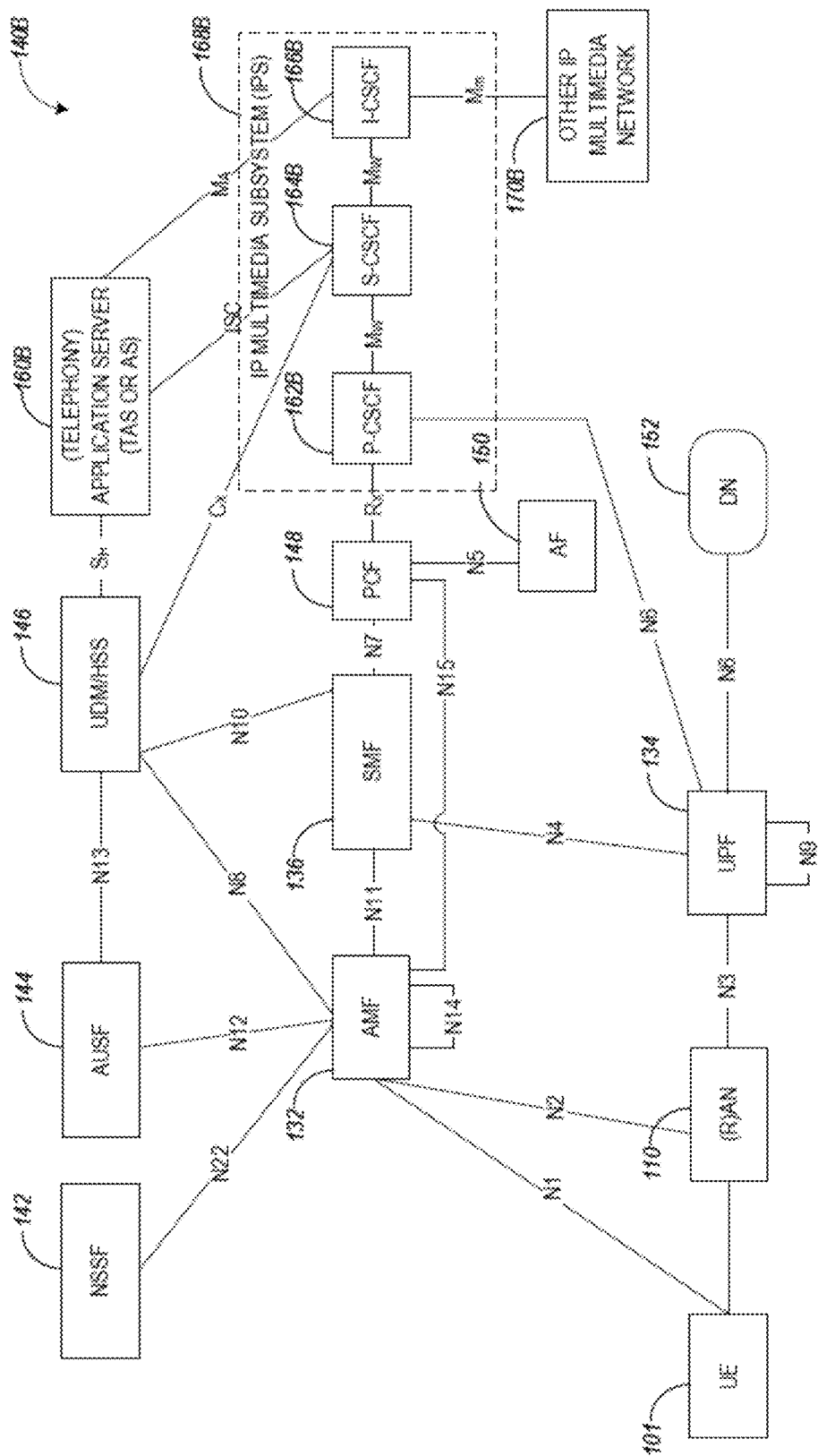
FIG. 1B illustrates a non-roaming 5G system architecture in accordance with some aspects.

FIG. 1B illustrates a non-roaming 5G system architecture in accordance with some aspects. In particular. FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E. e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
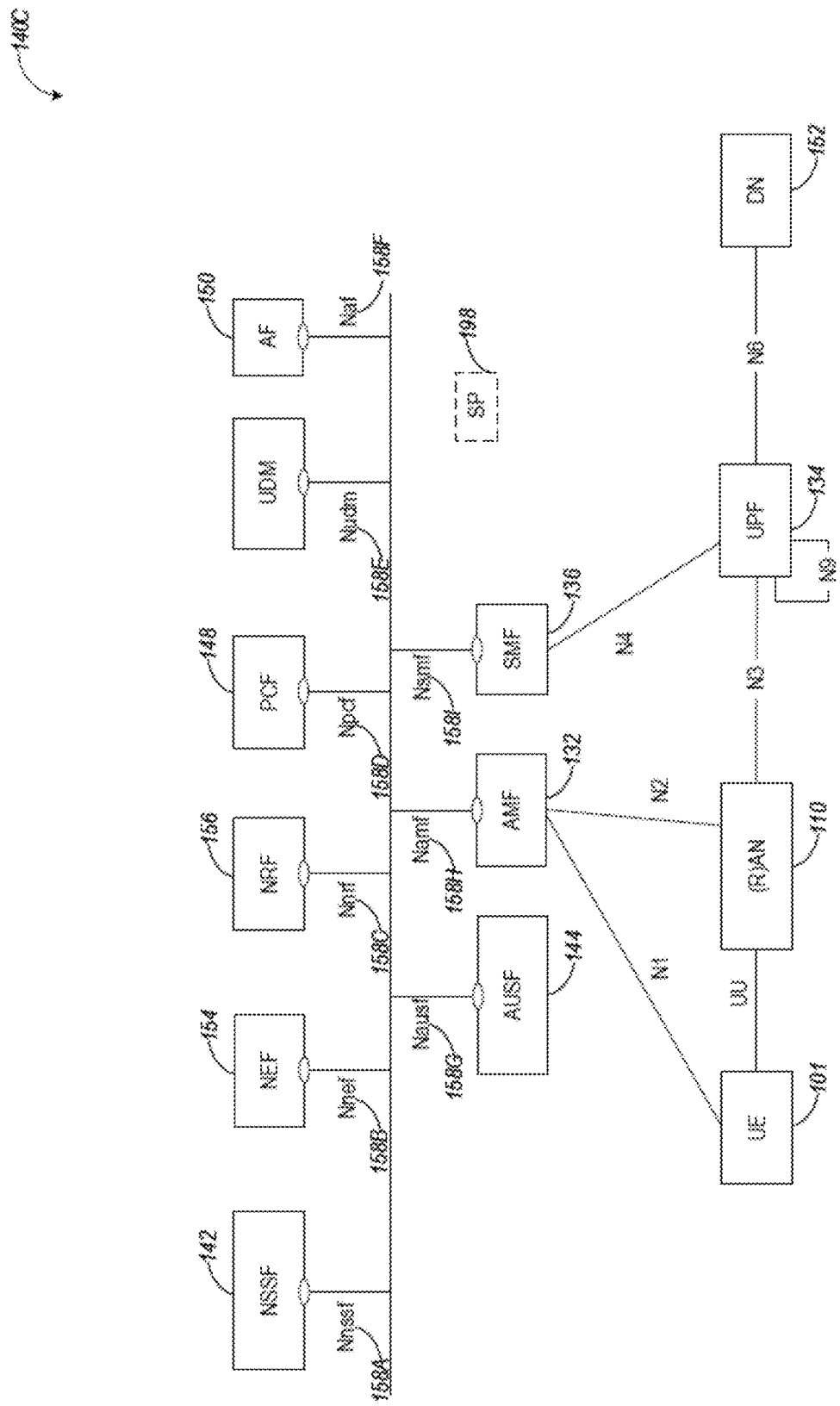
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
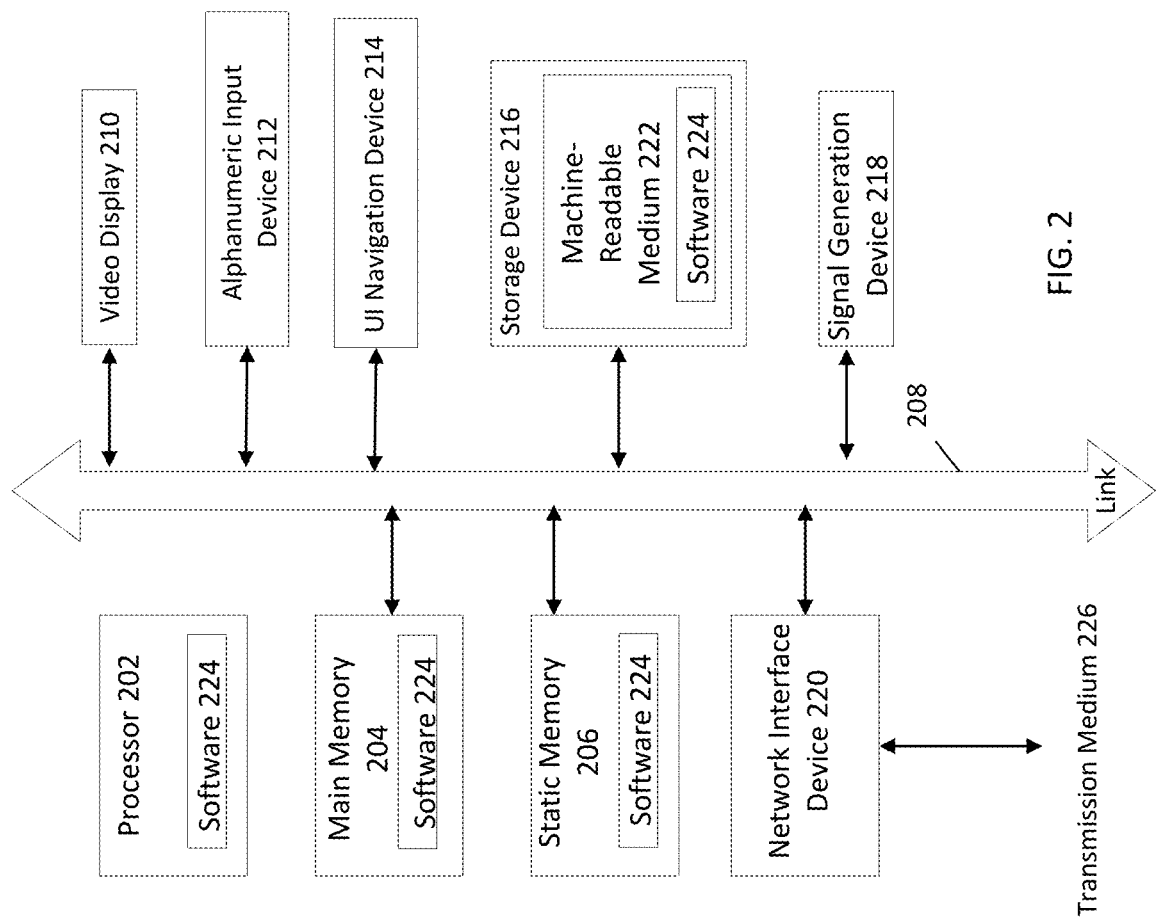
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks. Communications over the networks may include one or more different protocols, such as Institute of Electrical and Electronics Engineers (IEEE) 802.11 family of standards known as Wi-Fi®, IEEE 802.16 family of standards known as WiMax®, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Within the 5GC, the PCF provides ATSSS rules to both the SMF and the UE based on service provider policy. The UE and UPF may be configured with higher and/or lower layer steering functionality. Multipoint Transmission Control Protocol (MPTCP) is higher layer steering functionality that is carried out above the IP layer in the protocol stack and allows the UE to communicate with an MPTCP Proxy within the UPF to determine steering of application traffic. Lower layer steering functionality may categorize, for a given traffic flow, one of the access networks (3GPP or non-3GPP) as active and the other as standby. In some embodiments, the standby access network may only be used for the traffic flow if the active access network is unavailable. Lower layer steering functionality may also steer the given traffic flow to the access network that has the smallest delay with respect to Round Trip Time. Lower layer steering functionality may also split the given traffic flow across both access networks, based on a percentage split and/or steer the given traffic flow to the highest priority access network, until that access network is considered to be congested at which point, traffic can also be split towards the low priority access network.

To support adding 5G access to an environment in which a non-3GPP network has been installed, multiple issues should be addressed. These issues include how to determine ahead of time traffic routing so that different traffic can be routed via the independent access networks based on application use. For example, a multipath capable UE in a factory may establish a first session as the first leg of a multipath connection with a multiconnectivity function over a first access network, and then a second session as the second leg of the multipath connection with the multiconnectivity function over a second access network. The issues may also include how to enable the coordination between the multiconnectivity function in the application cloud for and the multiconnectivity function in the 5G system using with the existing multipath mechanisms (e.g., Multi-Connection Transmission Control Protocol (MCTCP) and/or ATSSS-lower layer (LL)). It is assumed herein that an AF in the 5GS provides Multi Access Management Services (MAMS) to UEs with multipath capability.

MAMS is a programmable framework (developed by Internet Engineering Task Force (IETF)) that provides mechanisms for flexible selection of network paths in a multi-connection (access) communication environment, based on application use. This programmable framework may be, or may include, a multi-connectivity function provided by a cloud computing service. MAMS leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the underlying individual access network.

Figure 3:
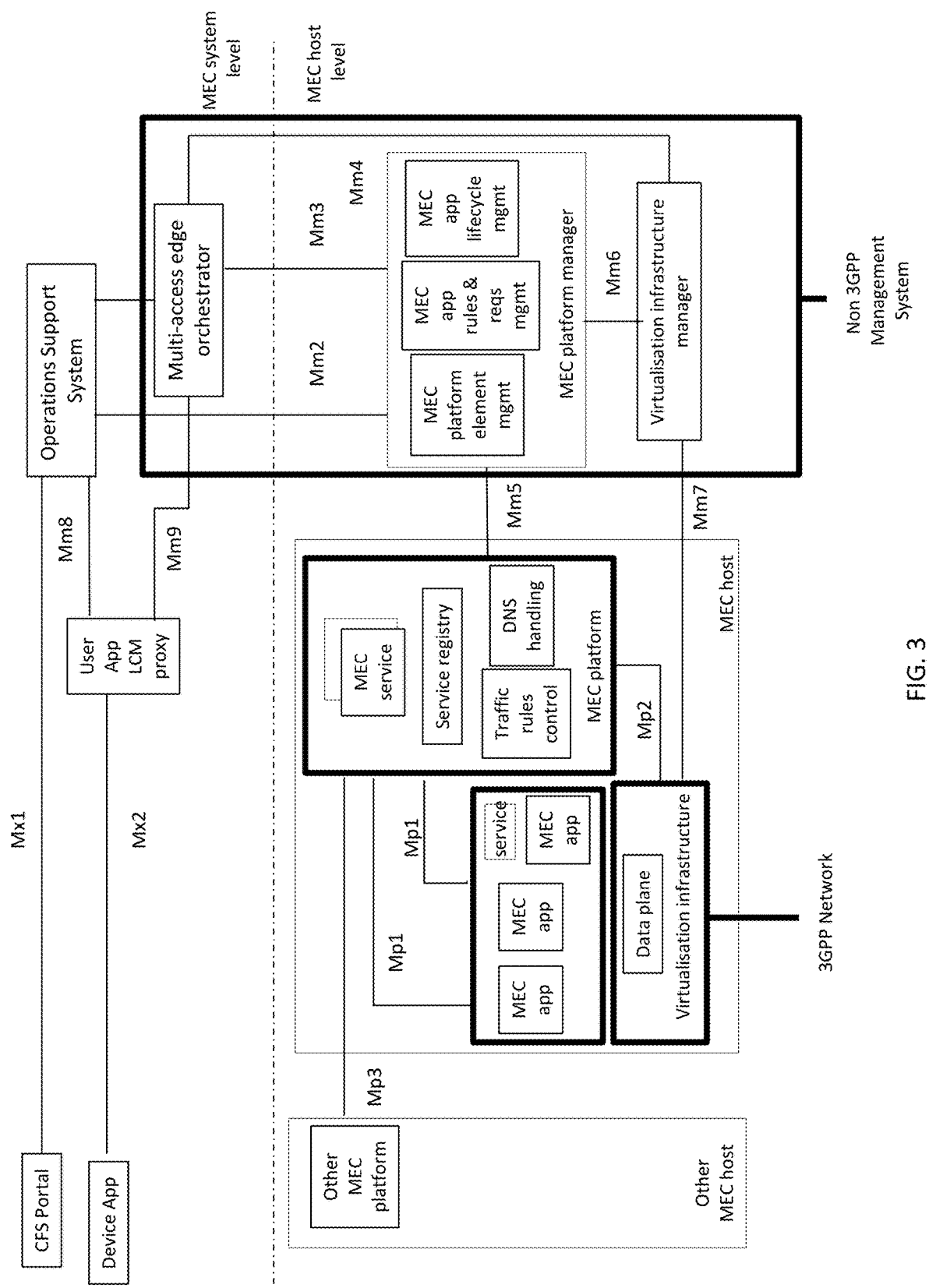
FIG. 3 illustrates a European Telecommunications Standards Institute (ETSI) Multi-access Edge Computing (MEC) application architecture with Data plane via 3GPP Network in accordance with some embodiments.

The MAMS framework can be supported by an edge computing system/network, such as ETSI MEC, which defines the technical requirements for the implementation of a MEC platform. FIG. 3 illustrates a European Telecommunications Standards Institute (ETSI) Multi-access Edge Computing (MEC) application architecture with Data plane via 3GPP Network in accordance with some embodiments. As shown by FIG. 3, the MAMS can be a MEC service that provides services to the MEC application over the Mp1 interface. The MEC platform can consume service provided by the network function in 3GPP network via a NEF or PCF if the AF is in a trusted domain.

Figure 4:
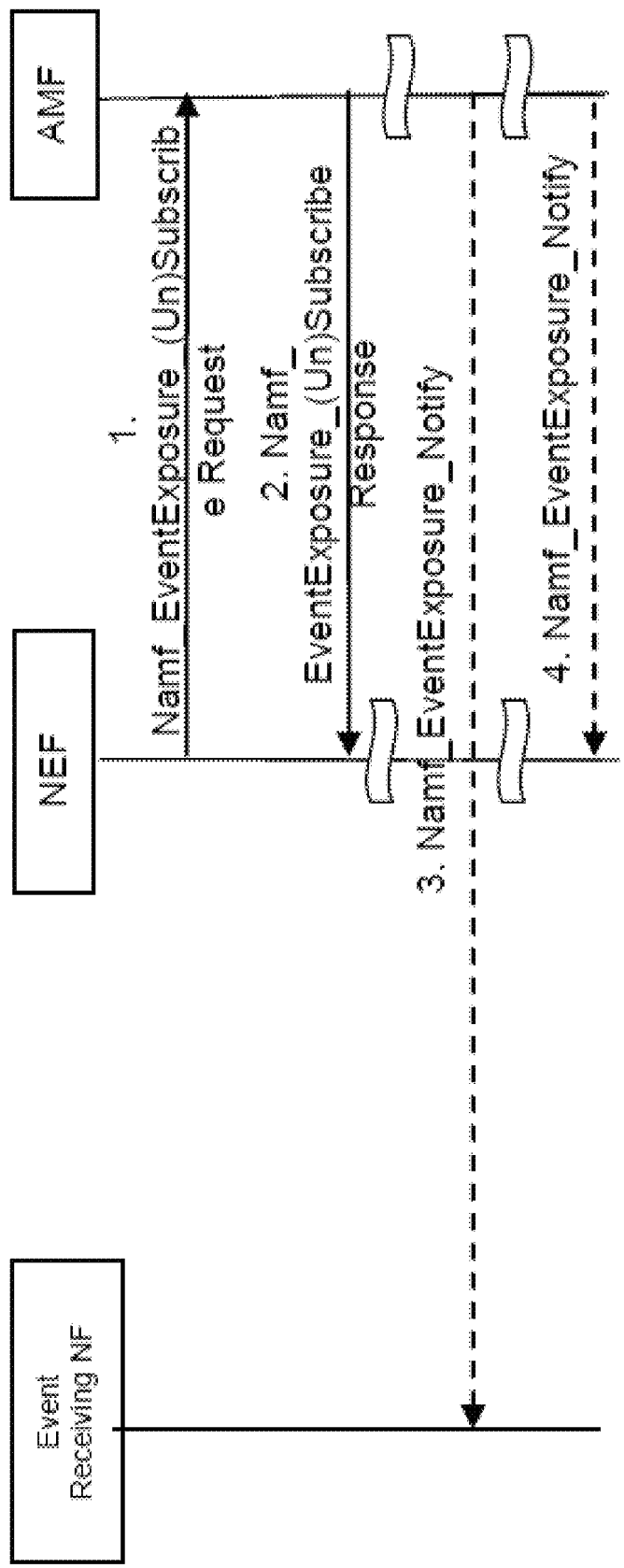
FIG. 4 illustrates 5G Application Mobility Management Event Exposure service procedure in accordance with some embodiments.

FIG. 4 illustrates 5G Application Mobility Management Event Exposure service procedure in accordance with some embodiments. FIG. 4 shows an example procedure used by an NF (e.g., an edge computing system and/or edge compute node) to subscribe to notifications, explicitly cancel a previous subscription (unsubscribe), and receive the notification message (Nam_EventExposure_Notify) when the subscribed event occurs. Cancellation is done by sending a Namf_EventExposure_UnSubscribe request identifying a subscription correlation ID. The notification operations 3 and 4 shown in FIG. 4 are not applicable in cancellation/unsubscribe cases. If the AMF receives a monitoring event subscription for roaming UEs and I-NEF is deployed as defined in clause 6.2.5a of 3GPP TS 23.501, clause 4.15.3.2.3a of TS 23.502 applies after step 2, both TS 23.501 and TS 23.502 are incorporated herein by reference. Other aspects of the procedure of in FIG. 4 are described by section 4.15.3.2.1 of TS 23.502. Currently, the following events are supported: Location-Report, Presence-In-Area of Interest (AOI)-Report, Time-Zone-Report, Access-Type-Report, Registration-State-Report, Connectivity-State-Report, Reachability-Report, Subscribed-Data-Report, Communication-Failure-Report, and UEs-In-Area-Report.

An AF may send requests to influence SMF routing decisions for User Plane traffic of PDU Sessions (see e.g., clause 5.6.7 of TS 23.501). The AF requests may influence UPF (re)selection and allow routing of user traffic to a local access (identified by a Data Network Access Identifier (DNAI)) to a DN. The AF may also provide in its request subscriptions to SMF events.

Figure 5:
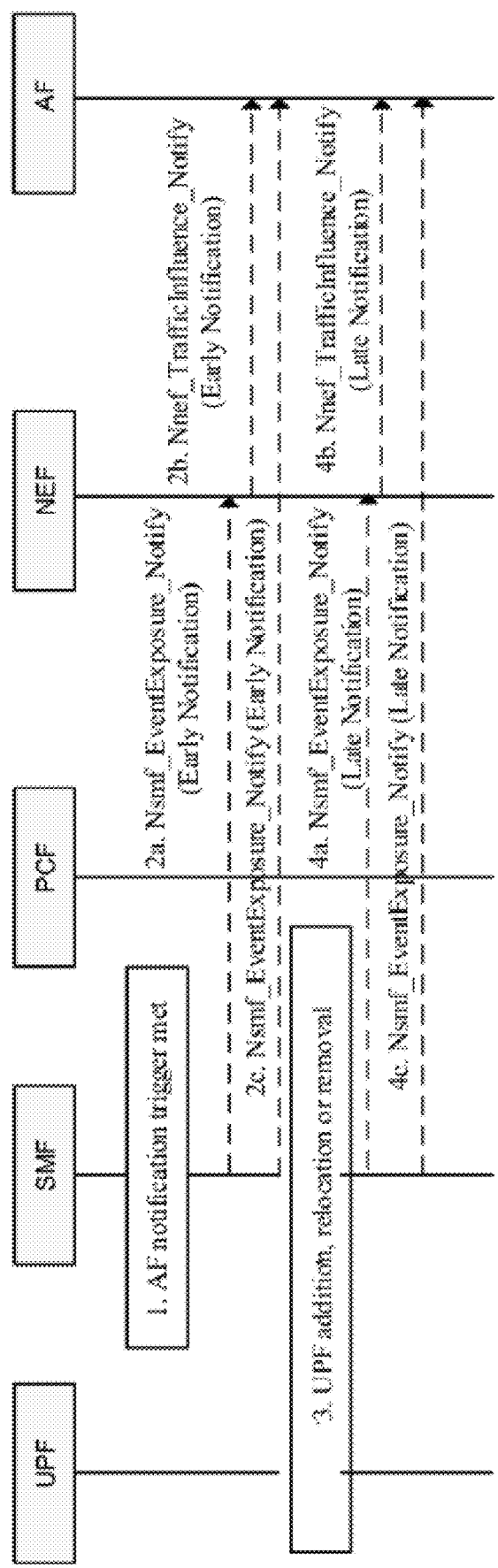
FIG. 5 illustrates notification of user plane management in accordance with some embodiments.

FIG. 5 illustrates notification of user plane management in accordance with some embodiments. The AF requests are sent to the PCF via the N5 interface (in the case of requests targeting specific on-going PDU Sessions of individual UE(s), for an AF allowed to interact directly with the 5GC NFs) or via the NEF. The AF requests that target existing or future PDU Sessions of multiple UE(s) or of any UE are sent via the NEF and may target multiple PCF(s), as described in clause 6.3.7.2 of TS 23.501. The PCF(s) transform(s) the AF requests into policies that apply to PDU Sessions. When the AF has subscribed to UP path management event notifications from SMF(s) (including notifications on how to reach a Generic Public Subscription Identifier (GPSI) over the N6 interface), such notifications are sent either directly to the AF or via a NEF (without involving the PCF). For an AF interacting with the PCF directly or via the NEF, the AF requests may contain the information as described in Table 1.

TABLE 1

Information Elements contained in AF request

| Information Name | Applicable for PCF or NEF (NOTE 1) | Applicable for NEF only | Category |
|---|---|---|---|
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s). | The potential locations of applications can be represented by AF-Service-Identifier. | Conditional (NOTE 2) |
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | Routing profile ID and/or N6 traffic routing information corresponding to each DNAI. | N/A | Optional |
| Application Relocation Possibility | Indicates whether an application can be relocated once a location of the application is selected by the 5GC. | N/A | Optional |
| UE IP address preservation indication | Indicates UE IP address should be preserved. | N/A | Optional |
| Temporal Validity Condition | Time interval(s) or duration(s). | N/A | Optional |
| Information on AF subscription to corresponding SMF events | Indicates whether the AF subscribes to change of UP path of the PDU Session and the parameters of this subscription. | N/A | Optional |

(NOTE 1):
When the AF request targets existing or future PDU Sessions of multiple UE(s) or of any UE and is sent via the NEF, as described in clause 6.3.7.2, the information is stored in the UDR by the NEF and notified to the PCF by the UDR.
(NOTE 2):
The potential locations of applications and traffic routing requirements may be absent only if the request is for subscription to notifications about UP path management events only.

Regarding notification of user plane management events, the SMF may send notifications to the AF if the AF has subscribed to user plane management event notifications as described in clause 4.3.6.2 of TS 23.502 and in clause 5.6.7 of TS 23.501. Examples of such events may include: (1) A PDU Session Anchor (PSA) identified in the AF subscription request has been established or released; (2) a DNAI has changed; and (3) the SMF has received a request for AF notification and the on-going PDU Session meets the conditions to notify the AF. The SMF uses notification reporting information received from PCF to issue the notification either via a NEF (2a, 2b and 4a, 4b) or directly to the AF (2c and 4c). Other aspects of the procedure shown in FIG. 5 are described at section 4.3.6.2 and 4.3.6.3 of TS 23.502.

Figure 6:
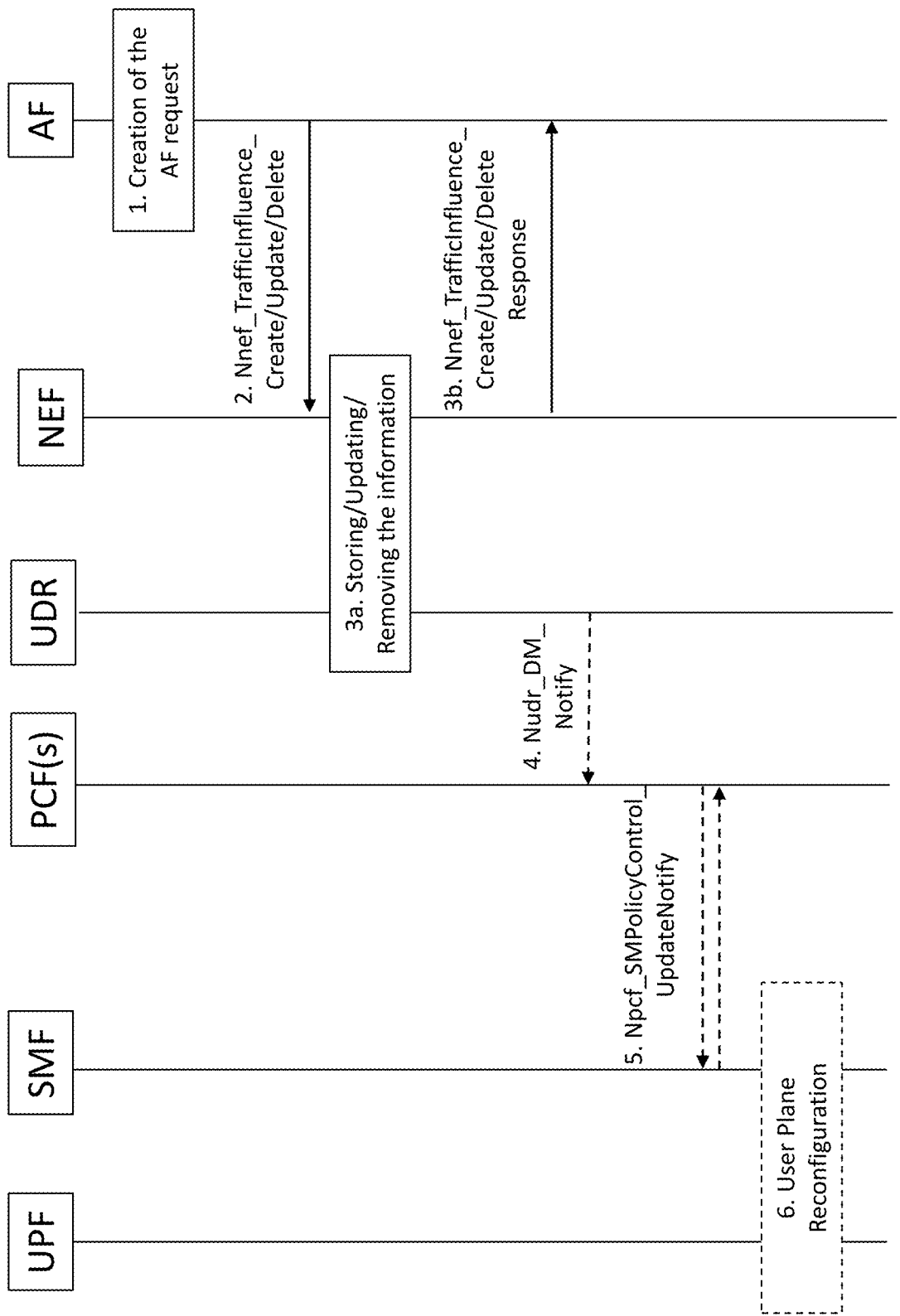
FIG. 6 illustrates processing AF requests to influence traffic routing for sessions not identified by a UE address in accordance with some embodiments.
Figure 7:
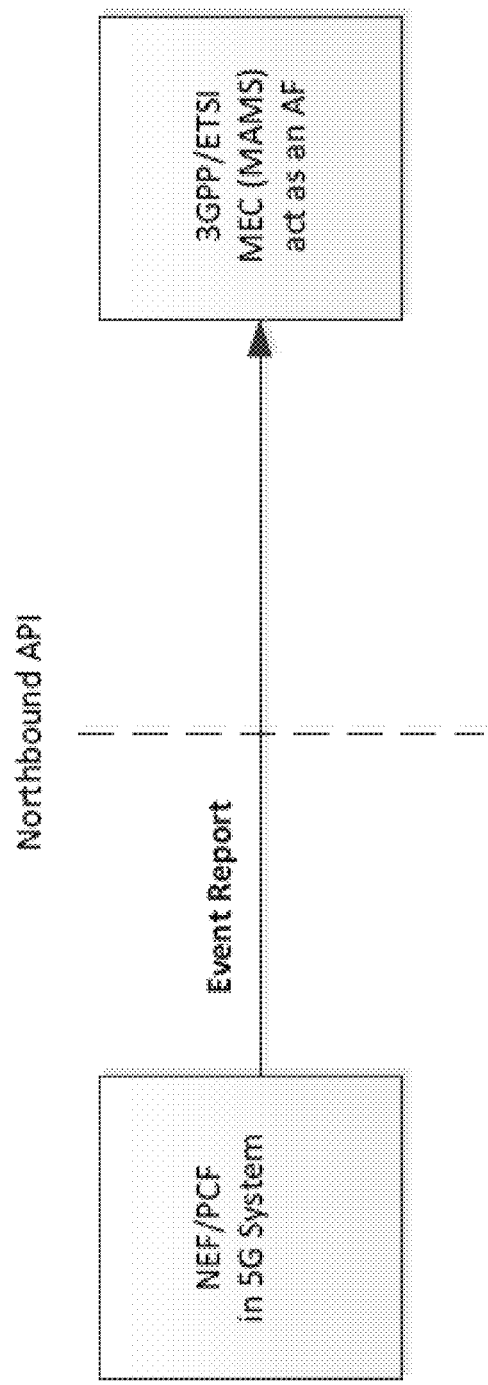
FIG. 7 illustrates event reporting in accordance with some embodiments.

FIG. 6 illustrates processing AF requests to influence traffic routing for sessions not identified by a UE address in accordance with some embodiments. FIG. 7 illustrates event reporting in accordance with some embodiments. In an edge computing (e.g., MEC) deployment scenario, the AF can act as an ETSI MEC platform or Edge Enabler Server for 3GPP edge computing, which has a multiconnectivity function to provide MAMS service for the UE. In these cases, a northbound Application Programming Interface (API) may be used to provide event reports, as is shown in FIG. 7.

In particular, as shown in FIG. 7, the northbound API is a service API exposed to higher-layer API invokers. An API invoker is an entity that invokes a Common API Framework (CAPIF) or service APIs, and a service API is an interface through which a component of a system (e.g., MAMS and/or an edge computing system) exposes its services to API invokers by abstracting the services from the underlying mechanisms. This is described in 3GPP TS 23.222, herein incorporated by reference in its entirety.

Figure 8:
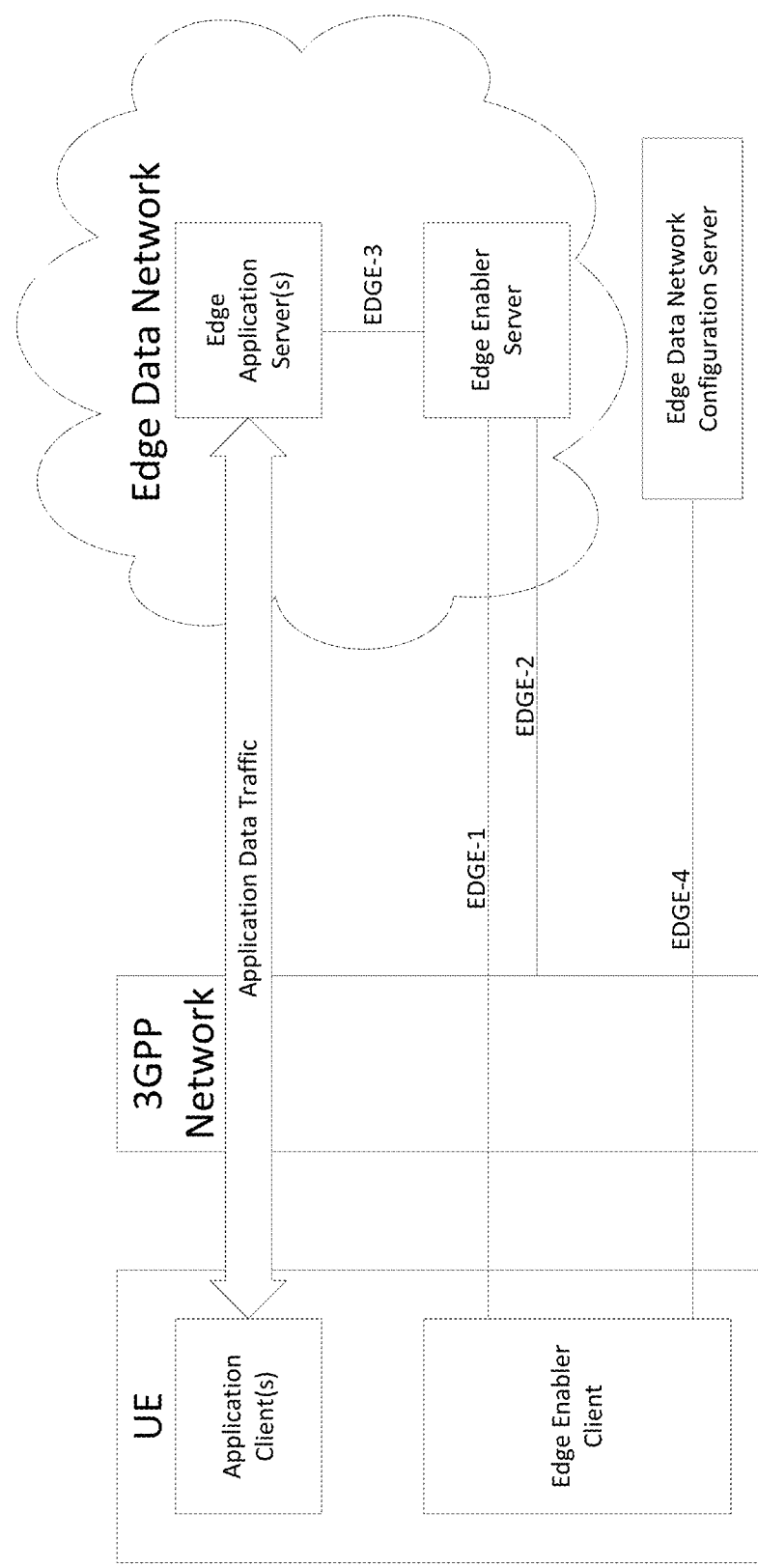
FIG. 8 illustrates application architecture for enabling edge applications in accordance with some embodiments.

FIG. 8 illustrates application architecture for enabling edge applications in accordance with some embodiments. FIG. 8 shows an example 3GPP-based application architecture for enabling Edge applications as described in 3GPP TS 23.758, herein incorporated by reference in its entirety. In FIG. 8, the Edge Enabler Server is a functional entity resident in the Edge Hosting Environment providing services for the Edge Application Servers and Edge Enabler Clients. The Edge Enabler Server provides supporting functions used by Edge Application Servers to run in an Edge Data Network, including provisioning of configuration information to enable the exchange of Application Data Traffic with the Edge Application Server(s); and providing information related to the Edge Application Servers, such as availability, to the Edge Enabler Client. The interactions related to enabling Edge Computing between the Edge Enabler Server and the Edge Enabler Client are supported by the EDGE-1 reference point. The interactions related to Edge Enabler Layer between the Edge Enabler Server and the 3GPP Network are supported by the EDGE-2 reference point.

The Edge Hosting Environment is an environment providing support required for Edge Application Servers execution. The Edge Application Server(s) are application servers (AS) resident in the Edge Hosting Environment (e.g., the Edge Data Network), where an AS is application software resident in the cloud performing server function(s). The interactions related to Edge Enabler Layer between the Edge Enabler Server and the Edge Application Servers are supported by the EDGE-3 reference point.

The Edge Enabler Client is a functional entity resident in a UE providing services for the Application Clients including, for example, retrieval and provisioning of configuration information to enable the exchange of Application Data Traffic with the Edge Application Server. The services also include discovery of Edge Application Servers available in the Edge Data Network. The Edge Data Network Configuration Server provides supporting functions used by the UE to connect with an Edge Enabler Server including, for example, provisioning of Edge Data Network configuration information to the Edge Enabler Client. The Edge Data Network configuration information includes information for the UE to connect to the Edge Data Networks with its service area information and information for establishing a connection with Edge Enabler Servers (such as URI). The interactions related to Edge Enabler Layer, between the Edge Data Network Configuration Server and the Edge Enabler Client are supported by the EDGE-4 reference point.

Figure 9:
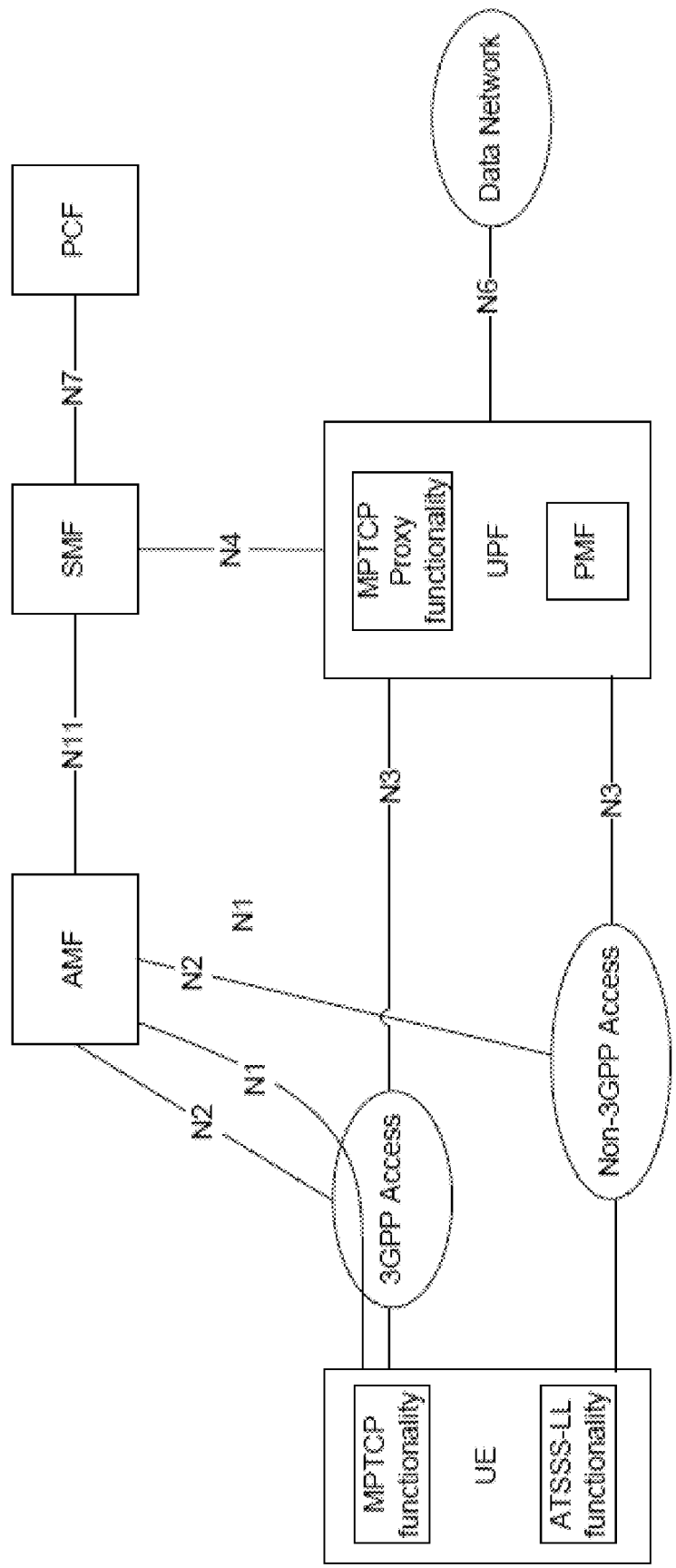
FIG. 9 illustrates a 3GPP 5G System Architecture with Access Traffic Steering, Switching and Splitting (ATSSS) Support in accordance with some embodiments.

Moreover, the 3GPP 5G system architecture has been extended to support ATSSS functionality, which is similar to MAMS. FIG. 9 illustrates a 3GPP 5G System ATSSS support in accordance with some embodiments. The coexistence scenario is addressed herein where both Edge (e.g., MEC)-based MAMS and 5G-based ATSSS are deployed.

As shown by FIG. 9, the UPF includes MPTCP Proxy functionality, which communicates with the MPTCP functionality in the UE by using the MPTCP protocol. The UPF supports ATSSS-LL functionality, which is similar to the ATSSS-LL functionality defined for the UE. There is no protocol defined between the ATSSS-LL functionality in the UE and the ATSSS-LL functionality in the UPF (not shown). In addition, the UPF supports Performance Measurement Functionality (PMF), which may be used by the UE to obtain access performance measurements (see clause 5.32.5 of TS 23.501) over the user-plane of 3GPP access and/or over the user-plane of non-3GPP access.

Figure 10:
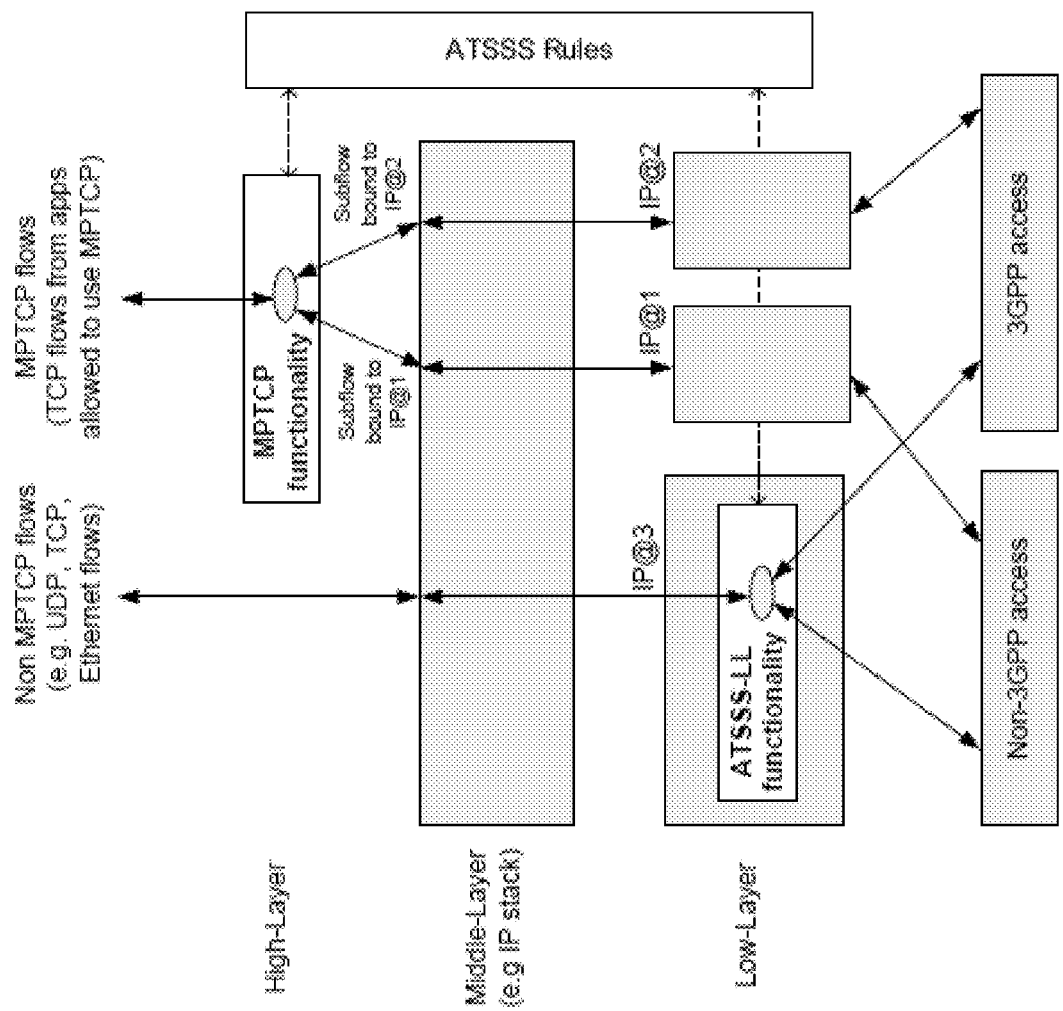
FIG. 10 illustrates steering functionalities in a UE model in accordance with some embodiments.

FIG. 10 illustrates steering functionalities in a UE model in accordance with some embodiments. FIG. 10 shows an example model for an ATSSS-capable UE supporting the MPTCP functionality and the ATSSS-LL functionality. The MPTCP flows in FIG. 10 represent the traffic of the applications for which MPTCP can be applied. The three different IP addresses illustrated in the UE are discussed in clause 5.32.6.2.1 of TS 23.501. The "Low-Layer" in FIG. 10 contains functionality that operates below the IP layer (e.g., different network interfaces in the UE), while the "High-Layer" contains functionality that operates above the IP layer. Within the same MA PDU Session in the UE, it is possible to steer the MPTCP flows by using the MPTCP functionality and, simultaneously, to steer all other flows by using the ATSSS-LL functionality. For the same packet flow, in some embodiments, only one steering functionality may be used.

Additionally, in FIG. 10, if MPTCP (Layer 4 approach) is used, the MA PDU session contains IP traffics of two interfaces over 3GPP access and Non-3GPP access with two corresponding IP addresses, i.e. IP@1 and IP@2. If ATSSS-LL (Layer 3 approach) is used, the MA PDU session contains IP traffics of two interfaces over 3GPP access and Non-3GPP access with one common IP addresses, i.e. IP@3. Other ATSSS aspects are discussed in clause 5.32 of TS 23.501.

According to various embodiments, a MAMS framework may be deployed or otherwise located at an AF. In these embodiments, this AF may be, or provide, a multiconnectivity function in an application cloud (or cloud computing service) to provide traffic routing policies and coordinate with ATSSS operation in the 5GS based on application use. In particular, embodiments include API enhancements to 5G 3GPP and/or ETSI MEC services, respectively. The embodiments herein may be applicable to some or all of the following standardization bodies: 3GPP SA1 and SA2 group; R7 Study Items for enhancement of CAV in SA1 and Rel-17 Study Items for enhancement of vertical services in SA2; 3GPP SA6 group for the FAAPP and EDGEAPP study in Rel-17 or enhancement in the future release; and ETSI MEC work item on MAMS.

The embodiments herein may enable the coexistence of ATSSS and MAMS, which may be used in future 5G-MEC integrations. Further, the embodiments herein may reduce or eliminate unnecessary signaling overhead, for example, assuming a 5G/MEC-enabled system, either the ATSSS or the MAMS functionality is operating at the UE side, in which the performance (e.g., measured in data throughput, latency, etc.) may avoid being compromised.

In different embodiments, the MAMS at the AF (e.g., multiconnectivity function in the cloud) can provide traffic routing policies and coordinate with ATSSS operation in the 5GS based on application use. The embodiments may permit the 5G system to be able to support coexistence of multi-connectivity functions in 3GPP network and non-3GPP networks, e.g., application cloud, to handle multipath session between UEs and an application server. The embodiments may also enable the 5G system to support a mechanism to coordinate policy for multi-connectivity functions in 3GPP network and with non-3GPP networks (e.g., Ethernet, WLAN). The embodiments may also enable the 5G system to support multi-connectivity functions in application cloud across independent networks which use existing multipath technologies.

Embodiment 1: Registration-State Report without PDU Session Information

In this embodiment, the AF can request for the service subscription of these events, as above, via the NEF or PCF (e.g., if the AF is in a trusted domain), and the NEF or PCF can make the request on behalf of the AF. In this way, the AF can obtain the information for provisioning the MAMS service to the UE with the flexible selection of network paths in a multi-connection (access) communication environment.

The NEF/PCF subscribes to "Registration-State-Report" event, based on the AF's service request, to receive the current registration state of a UE or a group of UEs. The NEF/PCF reports for updated registration state of a UE or any UE in the group when AMF becomes aware of a registration state change of the UE.

When the AF receives the notification information indicating the UE as registered, the AF further determines whether to send a request with the UE identifier and no ATSSS indication to the PCF for provisioning MAMS service for the UE. With the ATSSS indication, the SMF does not request a MAPDU session or activate ATSSS.

Embodiment 2: Event Report with PDU Session Status

Embodiment 2.1: Based on AMF

Following embodiment 1, a new filter for the notification event of the registration-state report from AMF can be further added: a PDU Session Filter. When this filter is set, the AMF may send out notification only if the subscribed event occurs, and the reported UE has a single PDU or MA-PDU session established, in which the AMF may query SMF for the PDU session status to get the information.

Embodiment 2.2: Based on SMF

Figure 11:
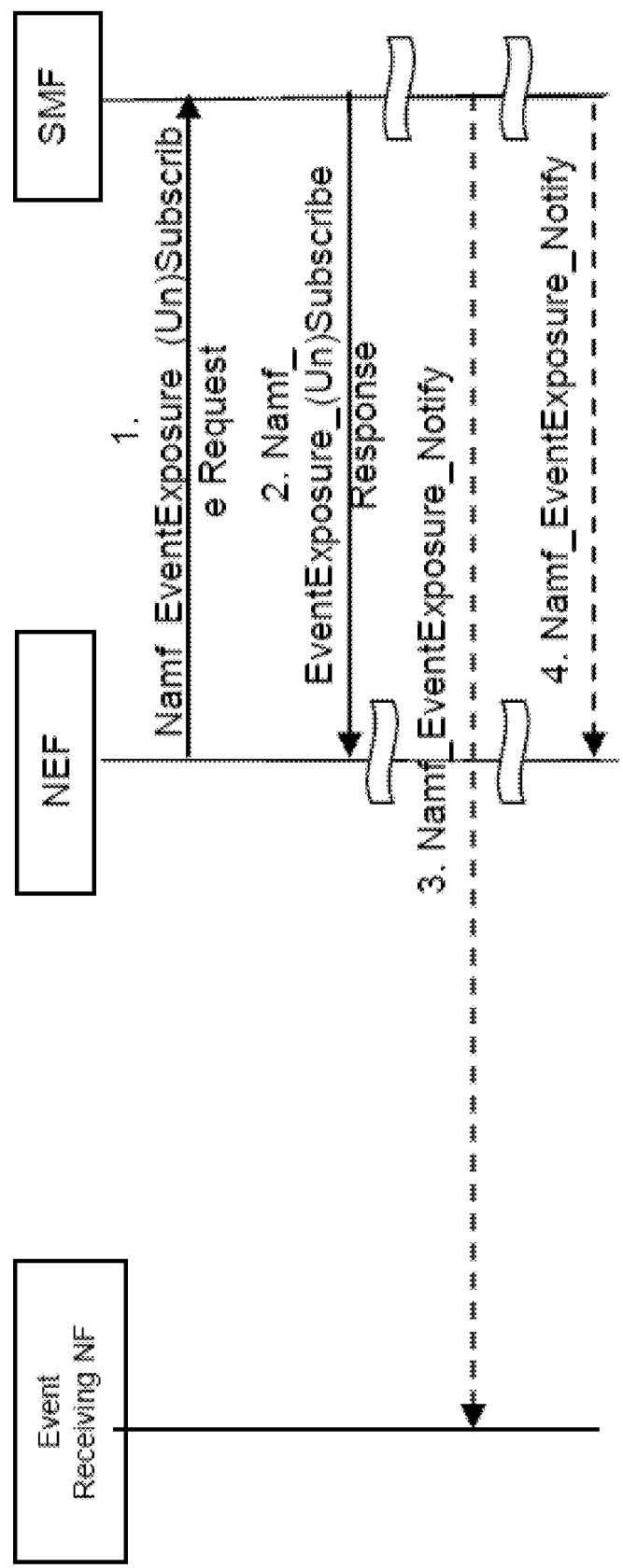
FIG. 11 illustrates a Session Management Function (SMF) Event Exposure Subscribe, Unsubscribe, and Notify procedure in accordance with some embodiments.

In this embodiment, the NEF can enable network capability exposure for the PDU session status of the UE (e.g., establishment/modification/deactivation) from an SMF. FIG. 11 illustrates an SMF Event Exposure Subscribe, Unsubscribe, and Notify procedure in accordance with some embodiments. In this embodiment, if the NEF/PCF subscribes to this event, based on the AF's service request, the NEF/PCF may receive the current status of a UE or a group of UEs. and report for updated PDU session status of a UE or any UE in the group when SMF becomes aware of a PDU session status change of the UE.

Embodiment 3: Notification Report

Following embodiment 2.1 or embodiment 2.2, the notification information from the NEF/PCF contains information whether a single PDU session or multiple PDU session has been established. If the notification indicates that a Single Access PDU session has been established, the information includes the IP address of the PDU session. If the notification indicates that a MA PDU session has been established, the information also includes the ATSSS feature activation list: MPTCP, ATSSS LL (Low-Layer). If MPTCP is activated, the report further includes the Multi-Access PDU link-specific multipath (3GPP) IP address (e.g., IP@2 in FIG. 10) and the Multi-Access PDU link-specific multipath (non-3GPP) IP address (e.g., IP@1 in FIG. 10). If ATSSS-LL is activated, the report further includes the following: Multi-Access PDU IP address (e.g., IP@3 in FIG. 10).

Embodiment 4: Traffic Steering

Following embodiment 3, traffic steering is enforced by the MAMS among two IP sessions coordinated via a single or a multiple PDU sessions in 3GPP network via AF inference on traffic routing.

Embodiment 4.1: Single Access PDU Session

Following embodiment 4, the MAMS provides traffic routing requests to the PCF directly or via the NEF if a single access PDU session is notified. Such traffic requests may include traffic information (e.g., IP 5 tuples); and an ATSSS indication. When the ATSSS indication setting is active (or inactive), the SMF does not request for MAPDU session or activate ATSSS, and vice versa.

Embodiment 4.2: MA PDU Session

Following embodiment 4, the MAMS provides traffic routing requests to the PCF directly or via the NEF if a multiple access PDU session is notified. Such traffic requests may include traffic information (e.g., IP 5 tuples); and a Suspend/Resume ATSSS indication. With the Suspend/Resume ATSSS indication setting as suspended, the SMF does not activate ATSSS for the MA PDU session. Additionally or alternatively, with the Suspend/Resume ATSSS indication setting as resume, the SMF can apply ATSSS for the MA PDU session.

Embodiment 4.3

In this embodiment, and based on embodiment 4.2, the MAMS provides service requests for the MAMS activation to the traffic that is not supported by the MPTCP to the PCF directly or via the NEF if the ATSSS feature activation list indicates "MPTCP". Such service requests may include the UE identifier (e.g., external identifier or group external identifier), traffic information (e.g., IP 5 tuples) and MAMS activation with the indicated traffic.

Embodiment 4.4

Following solution 4.3, when the NEF receives the service requests for the MAMS activation, the NEF checks the service authorization for the request of the AF and checks the service subscription of the UE for the MAMS. If successful, the NEF forwards the information to the PCF. The PCF may further provide the information to the SMF for handling the existing PDU sessions.

Embodiment 5: 3GPP Based ATSSS First Based on Service Request from AF

Following embodiment 1, when receiving the notification report, the AF can initiate a service request for the MAMS activation to the PCF or NEF if the AF has MAMS service support. If NEF receives the service request, the NEF checks the service authorization for the request from the AF and checks the service subscription of the UE for the MAMS. If successful, the NEF forwards the information to the PCF. If not successful, the NEF replies to the AF with a rejection.

Embodiment 5.1

Following embodiment 5, the PCF may further determine the UE's policy for the ATSSS or non-3GPP multi-access solution. If the ATSSS is set as active in the UE's policy, the PCF replies to the AF directly or via the NEF with information that the ATSSS is enabled. With the information of enabled ATSSS, the AF disables the MAMS service for the UE.

Embodiment 5.2

Following embodiment 5.1, if the ATSSS is active for the MPTCP only or the ATSSS is not active in the UE's policy, the PCF replies to the AF directly or via the NEF with the information that the ATSSS is not enabled. With the information that the ATSSS is disabled, the AF can activate the MAMS service for the UE.

Embodiment 5.3

Following embodiment 5, the PCF may further determine the UE's policy for non-3GPP multi-access solution. If non-3GPP multi-access is set as enabled in the UE's policy, the PCF replies to the AF directly or via the NEF with the information that the non-3GPP multi-access (e.g., MAMS) is enabled. With the information of enabled non-3GPP multi-access, the AF can activate the MAMS service for the UE.

Embodiment 5.4

Following embodiment 5, the PCF may further determine the UE's policy for non-3GPP multi-access solutions. If non-3GPP multi-access is set as disabled in the UE's policy, the PCF replies to the AF directly or via the NEF with information indicating that the non-3GPP multi-access (e.g., MAMS) is disabled. With the information that the non-3GPP multi-access is disabled, the AF may deactivate or disable the MAMS service for the UE.

MAMS and Edge Computing Aspects

MAMS mechanisms are not dependent on any specific access network type or user plane protocols (e.g., TCP, UDP, QUIC, GRE, MPTCP, etc.). MAMS co-exists and complements the existing protocols by providing a way to negotiate and configure these protocols based on client and network capabilities per access basis to match their use for a given multi-access scenario. Further, it allows load balancing of the traffic flows across the selected multiple accesses and exchange of network state information to be used for network intelligence to optimize the performance of such protocols.

Figure 12:
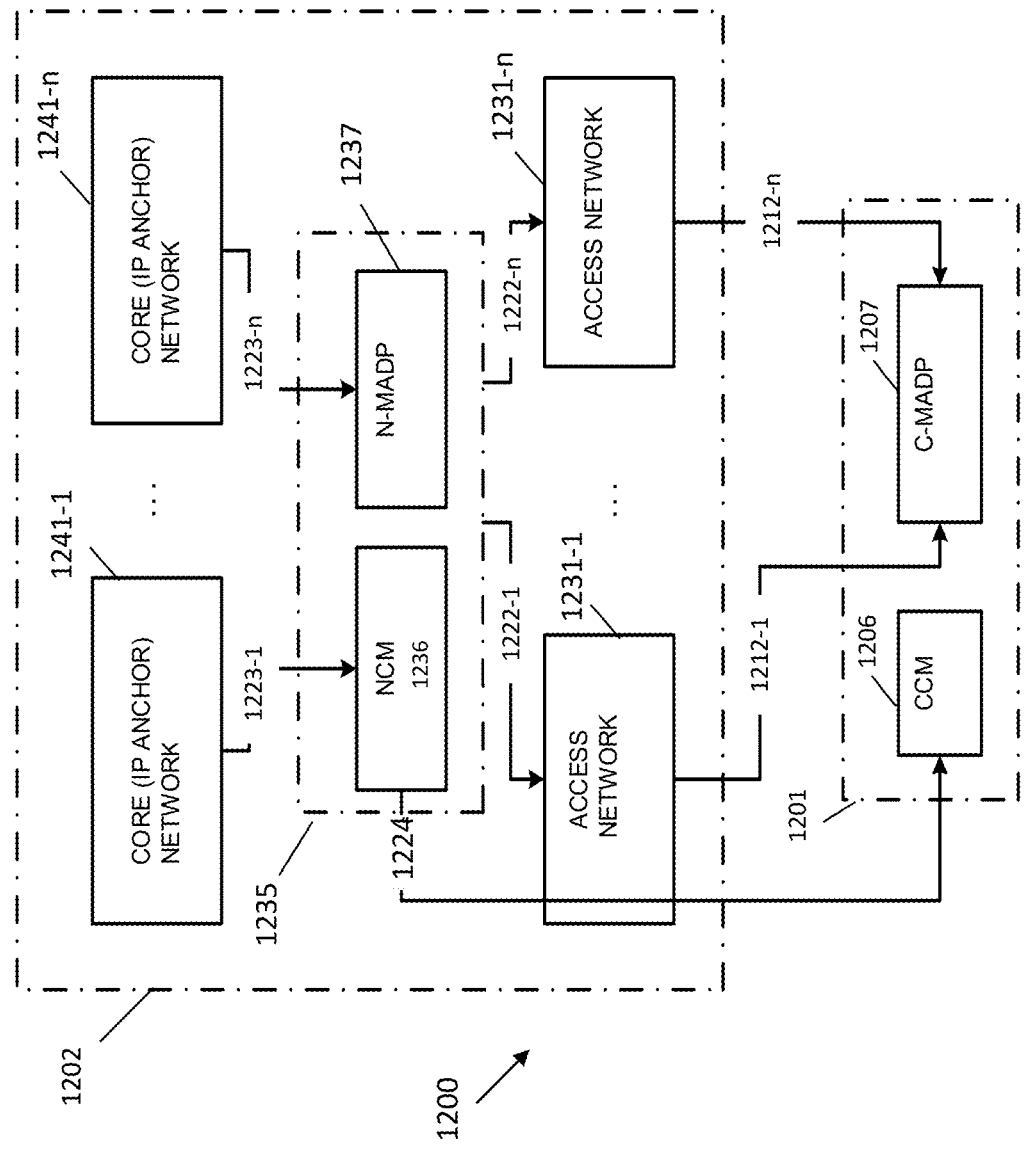
FIG. 12 illustrates a Multi Access Management Services (MAMS) reference architecture in accordance with some embodiments.

FIG. 12 illustrates a MAMS reference architecture in accordance with some embodiments. In FIG. 12, a client is served by multiple (n) networks. The MAMS framework allows for dynamic selection and flexible combination of access and core network paths as uplink and downlink for a device connected to multiple communication networks. The multiple communication networks interwork at the user plane. The architecture is extendable to combine any number of networks, as well as any choice of participating network types (e.g., LTE, WLAN, MuLTEfire, DSL, 5G/NR, etc.) and deployment architectures (e.g., with user plane gateway function at the access edge).

In FIG. 12, the client 1201 is served by multiple (1 to n) core networks 1241-1 to 1241-n (where n is a number). The MAMS architecture 1200 includes the following functional elements: a client 1201 including a Client Connection Manager (CCM) 1206 and a Client Multi Access Data Proxy (C-MADP) 1207; multiple (1 to n) AN elements 1231-1 to 1231-n; a MAMS system 1235 including a Network Connection manager (NCM) 1236 and a Network Multi Access Data Proxy (N-MADP) 1237; and the multiple (1 to n) core networks 1241-1 to 1241-n. The CCM 1206 and NCM 1236 handle control plane aspects, and the C-MADP 1207 and N-MADP 1237 handle user plane aspects. The core networks (or simply "cores") 1241-1 to 1241-n are elements that anchor the client's 1201 IP address used for communication with applications via the network. One or more of the cores 1241-1 to 1241-n may correspond to a CN and/or the cloud.

The client 1201 is an end-user device supporting connections with multiple access nodes (e.g., edge nodes), possibly over different access technologies. When the client 1201 is capable of handling multiple network connections, the client 1201 may be referred to as a "multiconnectivity client" or the like. The ANs 1231-1 to 1231-n are network elements in the network that deliver user data packets to the client 1201 via respective point-to-point access links 1211-1 to 1211-n, which may include, for example, WiFi links. LTE or NR cellular links. DSL connections, and/or the like. In some implementations, the point-to-point access links 1211-1 to 1211-n may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like.

The NCM 1236 is an element in the network that handles MAMS control messages from the client 1201 and configures distribution of data packets over the multiple available access paths 1221-1 to 1221-n, delivery paths 1222-1 to 1222-n, and/or core network paths 1223-1 to 1223-n, as well as user plane treatment of traffic flows. The NCM 1236 handles the MAMS control plane procedures, and configures the network (N-MADP) and client (C-MADP) user plane functions such as negotiating the client 1201 on the use of available access network paths 1221-1 to 1221-n, protocols and rules for processing user plane traffic, and/or link monitoring procedures. The control plane messages exchanged between the NCM 1236 and CCM 1206 are transported as an overlay, without any impact to the underlying access networks. The control plane path 1224 may be overlaid over any access user plane path. A "path" may be a UDP flow between two hosts, which may be denoted by a 4-tuple (IP source address, IP destination address, source port, destination port). In some embodiments, WebSocket is used for transporting management and control messages between the NCM 1236 and CCM 1206, wherein Multi Access (MX) Control Message are carried over (or encapsulated in) a WebSocket, and the WebSocket is carried over (or encapsulated in) TCP/TLS.

The CCM 1206 is an entity in the client 1201 that exchanges MAMS signaling with the NCM 1236 and configures the multiple network paths 1221-1 to 1221-$n$ at the client 1201 for transport of user data. The CCM 1206 is the peer functional element of the NCM 1236 in the client 1201 for handling MAMS control plane procedures. The CCM 1206 manages multiple network connections 1221-1 to 1221-$n$ at the client 1201. The CCM 1206 is responsible for exchanging MAMS signaling messages with the NCM 1236 for supporting functions such as uplink (UL) and downlink (DL) user network path configuration for transporting user data packets, link probing and reporting to support adaptive network path selection by NCM 1236. In the DL for user data received by the client 1201, the CCM 1206 configures C-MADP 1207 such that application data packet received over any of the accesses to reach the appropriate application on the client 1201. In the UL for the data transmitted by the client 1201, the CCM 1206 configures the C-MADP 1207 to determine the best access links 1221 to be used for UL data based on a combination of local policy and network policy delivered by the NCM 1236 over link 1224.

The C-MADP 1207 is an element in the client 1201 that handles user data traffic forwarding across multiple network paths. The C-MADP 1207 is responsible for MAMS-specific user plane functionalities in the client 1201 such as encapsulation, fragmentation, concatenation, reordering, retransmissions, etc. The C-MADP 1207 is configured by the CCM 1206 based on signaling exchange with the NCM 1236 and local policies at the client 1201. The CCM 1206 configures the selection of delivery connections 1222-1 to 1222-$n$ and the user plane protocols to be used for UL user data traffic based on the signaling exchanged with the NCM 1236.

The N-MADP 1237 is an entity in the network handles the user data traffic forwarding across multiple network paths. N-MADP 1237 is responsible for MAMS-specific user plane ("u-plane") functionalities in the network. Such as encapsulation, fragmentation, concatenation, reordering, retransmission, etc. The N-MADP 1237 is the distribution node that routes the UL user plane traffic to the appropriate anchor connection 1223-1 to 1223-$n$ towards a respective core network 1241-1 to 1241-$n$, and the DL user traffic to the client 1201 over the appropriate delivery connection(s) 1222-1 to 1222-$n$. The anchor connections 1223-1 to 1223-$n$ are network paths from the N-MADP 1237 to the user plane gateway (IP anchor) that has assigned an IP address to the client 1201, and the delivery connections 1222-1 to 1222-$n$ are network paths from the N-MADP 1237 to the client 1201.

In the DL, the NCM 1236 configures the use of delivery connections, and user plane protocols at the N-MADP 1237 for transporting user data traffic. The N-MADP 1237 may implement Equal-Cost Multi-Path routing (ECMP) support for the down link traffic. Additionally or alternatively, the N-MADP 1237 may be connected to a router or other like network element (e.g., an AP) with ECMP functionality. The NCM 1236 configures the N-MADP 1237 with a load balancing algorithm based on static and/or dynamic network policies. These network policies may include assigning access and core paths for specific user data traffic type, data volume-based percentage distribution, link availability and feedback information from exchange of MAMS signaling with the CCM 1206 at the client 1201, and/or the like. The N-MADP 1237 can be configured with appropriate user plane protocols to support both per-flow and per-packet traffic distribution across the delivery connections.

In the UL, the N-MADP 1237 selects the appropriate anchor connection 1223-1 to 1223-$n$ over which to forward the user data traffic, received from the client 1201 via one or more delivery connections 1222-1 to 1222-$n$. The forwarding rules in the UL at the N-MADP 1237 are configured by the NCM 1236 based on application requirements (e.g., Enterprise hosted Application flows via a WiFi anchor 1241 (e.g., the cloud), Mobile Operator hosted applications via a cellular core 1241 (e.g., the CN), and/or the like).

The NCM 1236 and the N-MADP 1237 can be either collocated with one another or instantiated on different network nodes. The NCM 1236 can setup multiple N-MADP 1237 instances in the network. The NCM 1236 controls the selection of an individual N-MADP 1237 instance by the client and the rules for distribution of user traffic across the N-MADP 1237 instances. In this way, different N-MADP 1237 instances may be used to handle different sets of clients for load balancing across clients. Additionally, the different N-MADP 1237 instances may be used for different address deployment topologies (e.g., N-MADP 1237 hosted at the user plane node at the access edge or in the core network, while the NCM 1236 hosted at the access edge node), as well as address access network technology architecture. For example, an N-MADP 1237 instance at a CN node 1241 may be used to manage traffic distribution across LTE and DSL networks, and another N-MADP 1237 instance at a (R)AN node 131/132 may be used to manage traffic distribution across LTE and WiFi traffic. Furthermore, a single client 1201 can be configured to use multiple N-MADP 1237 instances, which may be used for addressing different application requirements. For example, individual N-MADP 1237 instances may be used to handle TCP and UDP transport-based traffic.

The CCM 1206 and NCM 1236 exchange signaling messages to configure the user plane functions, C-MADP 1207 and N-MADP 1237, at the client and network respectively. The CCM 1206 may obtain the CCM 1236 credentials (FQDN or IP Address) for sending the initial discovery messages. As an example, the client 1201 can obtain the NCM 1236 credentials using methods like provisioning, DNS query. Once the discovery process is successful, the (initial) NCM 1236 can update and assign additional NCM 1236 addresses, for example, based on MCC/MNC tuple information received in the NX Discovery Message, for sending subsequent control plane messages.

The CCM 1206 discovers and exchanges capabilities with the NCM. The NCM 1236 provides the credentials of the N-MADP 1237 end-point and negotiates the parameters for user plane with the CCM 1206. CCM 1206 configures C-MADP 1207 to setup the user plane path (e.g., MPTCP/UDP Proxy Connection) with the N-MADP 1237 based on the credentials (e.g., (MPTCP/UDP) Proxy IP address and port. Associated Core Network Path), and the parameters exchanged with the NCM 1236. Further, NCM 1236 and CCM 1206 exchange link status information to adapt traffic steering and user plane treatment with dynamic network conditions.

In embodiments, a UDP connection may be configured between the C-MADP 1207 and the N-MADP 1237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 1237 end-point IP address and UDP port number of the UDP connection is used to identify MX control PDUs.

The various elements depicted in FIG. 12 may be implemented using a variety of different physical and/or virtualized components. In some embodiments, for example, the elements within MAMS network 1202 may be implemented using one or more components of an edge node, such as one or more LTE or 5G RANs, or the MEC system. In some embodiments, the MAMS system 1235 may be implemented in or by an individual RAN node, such as one or more RAN nodes. In one example, the MAMS system 1235 is implemented as part of the layer 3 (L3) protocol stack (e.g., the RRC layer or the like). In another example, the MAMS system 1235 is implemented as part of a layer above L3 such as the network layer (e.g., IP, UDP, GTP-U, etc.) data-plane protocol stack of the RAN node 131/132. In another example of such embodiments, the MAMS system 1235 may be is implemented as a separate layer between the L3 and upper layers. In another example of such embodiments, the MAMS system 1235 may be implemented in or by a gNB-CU of a CU/DU split architecture. In another example of such embodiments, the MAMS system 1235 may be implemented in or by a vBBU pool, or a cloud RAN (C-RAN). In embodiments where a MEC framework is used, the MAMS system 1235 may be implemented in or by a MEC host (or a MEC server) that is located in, or co-located with, RAN such as one or more MEC servers. Alternatively, the functional elements within MAMS network 1202 may be implemented by one or more network functions (or as a VNF) of a CN. For example, the N-MADP 1237 may run on an S-GW or P-GW when the CN is an EPC, or the N-MADP 1237 may run on a UPF when the CN is a 5GC.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for an application function (AF) configured for operation in a fifth-generation system (5GS), the apparatus comprising:
processing circuitry to configure the AF to, for multiple access management service (MAMS):
transmit, to one of a network exposure function (NEF) in response to the AF being in an external data network or policy control function (PCF) in response to the AF being in a trusted domain, an event report request for service subscription to an event report of a user equipment (UE), the event report indicating a current status or a change in an event status for the UE from a network function, the event report request including being for a current registration state or a change in registration state for the UE from an access and mobility function (AMF);
receive, from the one of the NEF or PCF, a particular event report indicating a status of a requested event for the UE; and
in response to notification of the particular event report indicating the current registration state or change in registration state for the UE, transmit to the one of the NEF or PCF for subsequent transmission to a Session Management Function (SMF), a request with a UE identifier and an indication not to employ Access Traffic Steering, Switching and Splitting (ATSSS) functionality for provisioning the MAMS service for the UE; and memory configured to store the event report.

2. The apparatus of claim 1, wherein the event report request comprises a packet data unit (PDU) Session Filter, the PDU Session Filter configured to limit notification of the particular event report for the registration state change by the AMF to the one of the NEF or PCF only in response to the UE having a single PDU session or a multiple access PDU session established.

3. The apparatus of claim 1, wherein the event report request is configured to be supplied by the one of the NEF or PCF to the SMF and the one of the NEF or PCF receives the particular event report in response to the SMF becoming aware of a change of a packet data unit (PDU) session status change of the UE.

4. The apparatus of claim 1, wherein the event report request further indicates whether a packet data unit (PDU) session has been established for the UE, and which of a single or multiple access (MA) PDU session the PDU session is.

5. The apparatus of claim 4, wherein in response to notification of the particular event report indicating the single access PDU session has been established for the UE, the particular event report further includes an internet protocol (IP) address of the single access PDU session.

6. The apparatus of claim 5, wherein in response to notification of the particular event report indicating the single access PDU session has been established for the UE:
the processing circuitry is to configure the AF to provide, to the one of the PCF or NEF, traffic routing requests including traffic information and an ATSSS indication that indicates in response to ATSSS of the UE being active, and
the ATSSS indication, in response to indicating that the ATSSS is inactive, is configured to instruct the SMF to not request a MAPDU session or activate ATSSS for the UE.

7. The apparatus of claim 4, wherein in response to notification of the particular event report indicating the MA PDU session has been established for the UE, the particular event report further provides an ATSSS feature activation list indicating activated ATSSS features for traffic flows of the UE, including ATSSS functionality or Multipoint Transmission Control Protocol (MPTCP) Proxy functionality.

8. The apparatus of claim 7, wherein in response to the notification of the particular event report indicating ATSSS functionality is activated, the particular event report further contains a MA internet protocol (IP) address of the UE.

9. The apparatus of claim 7, wherein in response to the particular event report indicating MPTCP Proxy functionality is activated, the notification of the event report further contains a 3GPP MA PDU link-specific multipath internet protocol (IP) address and a non-3GPP MA PDU link-specific multipath IP address.

10. The apparatus of claim 7, wherein min response to the notification of the particular event report indicating the MA PDU session has been established for the UE:
the processing circuitry is to configure the AF to provide, to the one of the PCF or NEF, traffic routing requests including traffic information and a suspend/resume ATSSS indication,
the suspend/resume ATSSS indication, in response to indicating that the ATSSS is suspended, is configured to instruct the SMF to not activate ATSSS for the MA PDU session, and
the suspend/resume ATSSS indication, in response to indicating that the ATSSS is resumed, is configured to instruct the SMF to activate ATSSS for the MA PDU session.

11. The apparatus of claim 10, wherein the processing circuitry is to configure the AF to provide to the one of the PCF or NEF a service routing request configured to instruct the one of the PCF or NEF to activate MAMS for traffic that is not supported by the MPTCP in response to the ATSSS feature activation list indicating "MPTCP", the service routing request comprising a UE identifier, traffic information, and MAMS activation with indicated traffic.

12. The apparatus of claim 11, wherein the processing circuitry is to configure the AF to provide to the NEF a service routing request configured to instruct the NEF to activate MAMS by determination of service authorization and service subscription of the UE for MAMS and, in response to being successful, forward MAMS activation to the PCF to provide the MAMS activation to the SMF for handling of existing PDU sessions of the UE.

13. The apparatus of claim 1, wherein the processing circuitry is to configure the AF to generate a service request to the NEF for service authorization for the MAMS after receiving notification of the particular event report, the service authorization and service subscription of the UE checked by the NEF for the MAMS and forwarded to the PCF in response to the UE having a service subscription of the MAMS, and the service authorization being successful.

14. The apparatus of claim 1, wherein the processing circuitry is to configure the AF to receive information that ATSSS is enabled directly from the PCF, which determines UE policies, or via the NEF, in response to ATSSS being set as active in one of the UE policies and the processing circuitry having disabled the MAMS service for the UE.

15. A non-transitory computer-readable storage medium that stores instructions for execution by one or more processors of an access function (AF), the instructions when executed configure the one or more processors to configure the AF to:
transmit, to one of a network exposure function (NEF) or policy control function (PCF), a request for service subscription to a registration-state report of a user equipment (UE), the registration-state report indicating a change in registration state for the UE when an access and mobility function (AMF) becomes aware of a registration state change of the UE;
receive, from the one of the NEF or PCF, a registration-state report indicating that the UE is registered; and
in response to reception of the registration-state report, transmit to the one of the NEF or PCF for subsequent transmission to a Session Management Function (SMF), a request with a UE identifier and an indication not to employ Access Traffic Steering, Switching and Splitting (ATSSS) functionality for provisioning Multi Access Management Services (MAMS) service for the UE.

16. The medium of claim 15, wherein the request for service subscription comprises a packet data unit (PDU) Session Filter, the PDU Session Filter configured to limit notification of the registration state change by the AMF to the one of the NEF or PCF only in response to the UE having a single PDU session or a multiple access PDU session established.

17. A non-transitory computer-readable storage medium that stores instructions for execution by one or more processors of a policy and control function (PCF), the instructions when executed configure the one or more processors to configure the PCF to:
receive, from an application function (AF), a request for service subscription to a registration-state report of a user equipment (UE);

in response to reception of the request from the AF, subscribe to a registration-state report event to receive a current registration state of the UE;

receive, from an access and mobility function (AMF), a registration-state report event indicating a registration state change of the UE;

transmit, for transmission to the AF, a registration-state report indicating if the UE is registered; and receive, from the AF or a network exposure function (NEF), a service request for Multi Access Management Services (MAMS) activation, the service request forwarded by the NEF from the AF to the PCF after determination by the NEF that a service authorization for the service request from the AF and a service subscription of the UE for the MAMS are successful.

* * * * *

UNITED STATES PATENT AND TRADEMARK OFFICE
CERTIFICATE OF CORRECTION

PATENT NO. : 11,638,316 B2
APPLICATION NO. : 16/935520
DATED : April 25, 2023
INVENTOR(S) : Liao et al.

It is certified that error appears in the above-identified patent and that said Letters Patent is hereby corrected as shown below:

In the Claims

In Column 23, Line 51, In Claim 10, delete "min" and insert --in-- therefor

In Column 25, Line 7, In Claim 17, before "to", delete "for transmission"

Signed and Sealed this
Tenth Day of September, 2024

Katherine Kelly Vidal
*Director of the United States Patent and Trademark Office*